(12) United States Patent  (10) Patent No.: US 6,520,291 B2
Andrey  (45) Date of Patent: Feb. 18, 2003

(54) PORTABLE LOOKOUT

(76) Inventor: Gérard Andrey, 1784 Cournillens (CH)

( * ) Notice: Subject to any disclaimer, the term of this patent is extended or adjusted under 35 U.S.C. 154(b) by 0 days.

(21) Appl. No.: 09/810,618

(22) Filed: Mar. 19, 2001

(65) Prior Publication Data

US 2001/0023794 A1 Sep. 27, 2001

(30) Foreign Application Priority Data

Mar. 27, 2000 (EP) .............................................. 00810257

(51) Int. Cl.⁷ .................................................. E06C 7/16
(52) U.S. Cl. ...................................... 182/116; 182/195
(58) Field of Search .......................... 182/116, 20, 187, 182/188, 195

(56) References Cited

U.S. PATENT DOCUMENTS

| | | | | |
|---|---|---|---|---|
| 4,045,040 A | * | 8/1977 | Fails | ............................ 182/26 |
| 4,592,446 A | | 6/1986 | White | |
| 4,742,888 A | | 5/1988 | Amacker | |
| 4,776,503 A | * | 10/1988 | Sink | ............................ 182/187 |
| 4,787,476 A | | 11/1988 | Lee | |
| 5,009,283 A | * | 4/1991 | Prejean | ........................ 182/116 |
| 5,332,063 A | | 7/1994 | Amacker | |
| 5,368,127 A | | 11/1994 | Phillips | |
| 5,460,240 A | * | 10/1995 | Jones | .......................... 182/116 |
| 5,492,198 A | * | 2/1996 | Williams | ...................... 182/136 |
| 5,566,780 A | | 10/1996 | Bambrough | |
| 5,743,355 A | | 4/1998 | McDonnell et al. | |
| 5,791,436 A | | 8/1998 | Talley, Sr. | |

FOREIGN PATENT DOCUMENTS

DE  41 09 166 A1  10/1991

* cited by examiner

Primary Examiner—Alvin Chin-Shue
(74) Attorney, Agent, or Firm—Oliff & Berridge, PLC

(57) ABSTRACT

The lookout, designed to lean against a substantially cylindrical and vertical support extending above the ground, comprises a ladder having at least one upright provided with a plurality of rungs spaced at a predetermined distance. The ladder is telescopic, so that it has a total useful length capable of being reduced. The lookout further comprises a platform borne at the upper end of the ladder and provided with means for being braced against the support.

16 Claims, 6 Drawing Sheets

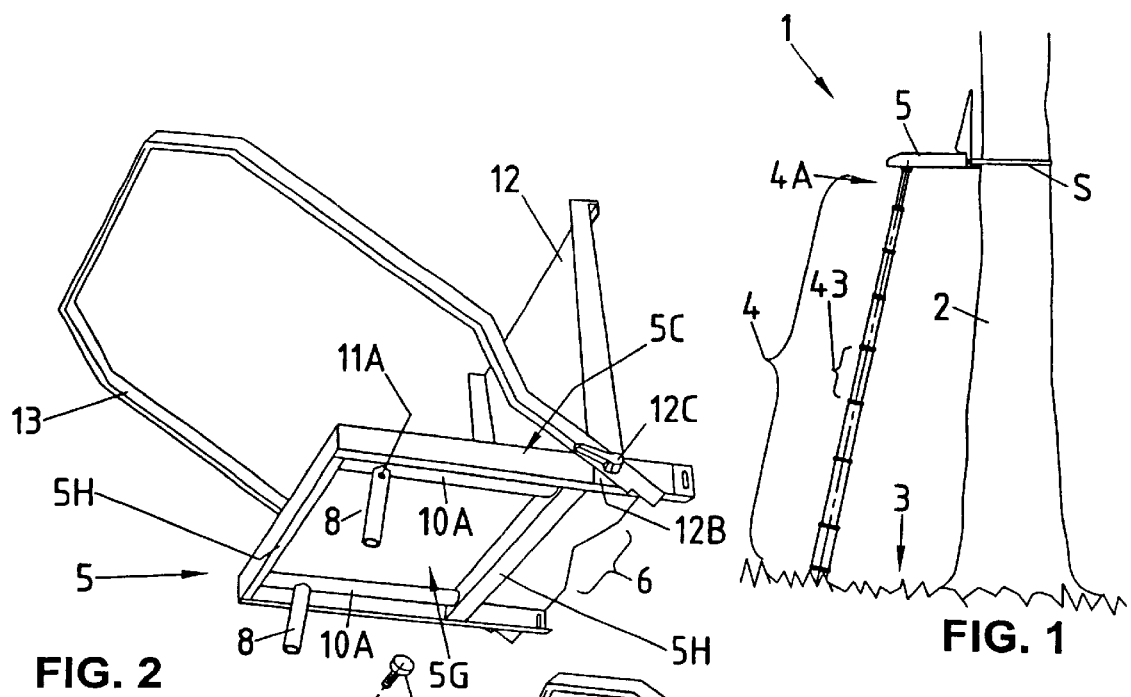
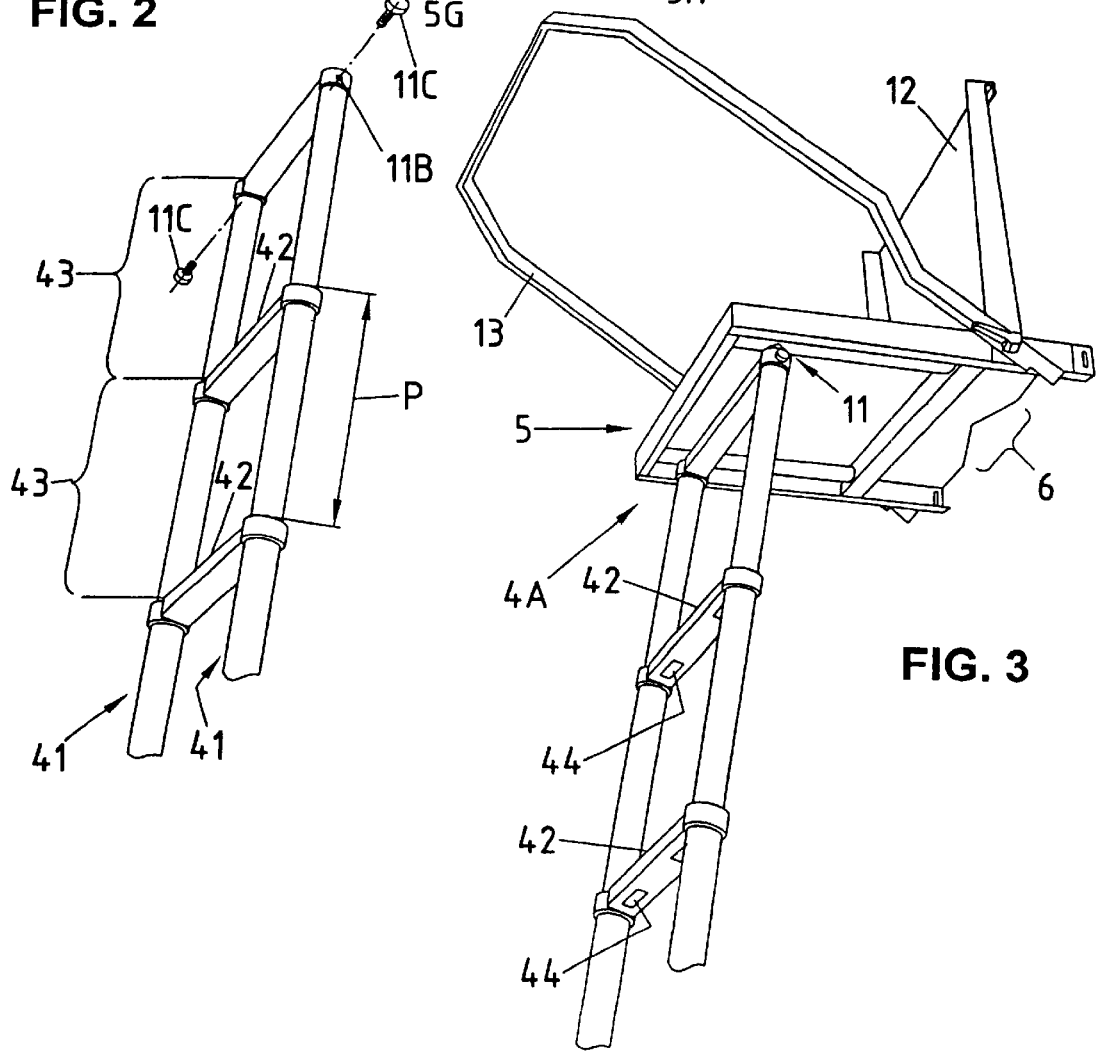

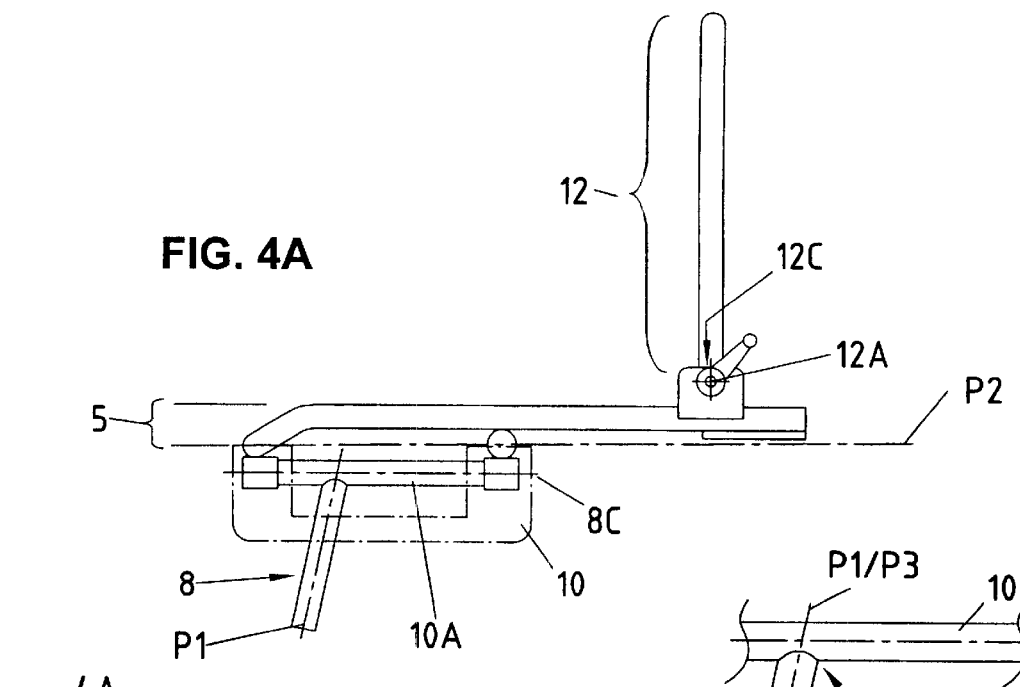
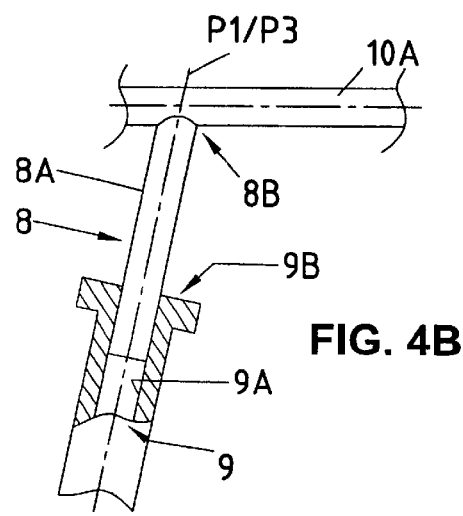
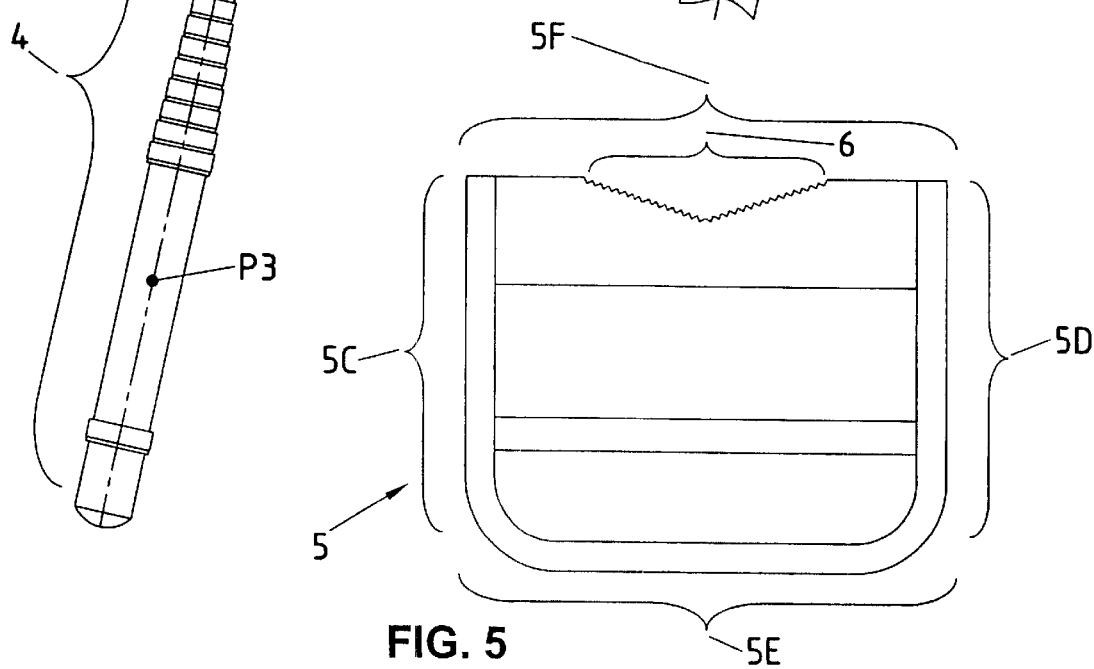

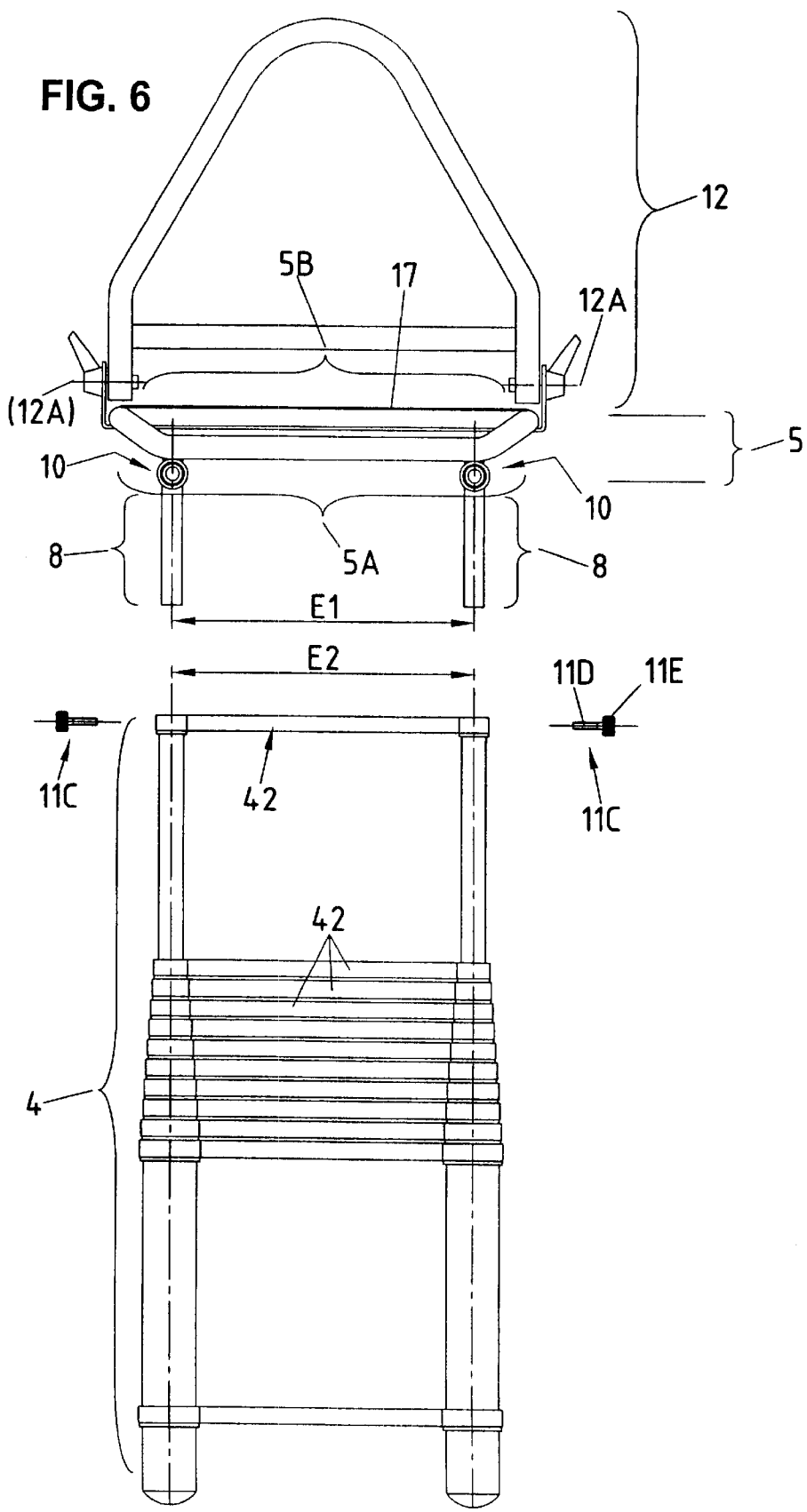

PORTABLE LOOKOUT

BACKGROUND OF THE INVENTION

1. Field of the Invention

This invention relates to observation posts, and more particularly to a lookout of the type designed to be rested against a substantially cylindrical and vertical support extending above the ground, this lookout having essentially a ladder including, on the one hand, at least one upright provided with a plurality of rungs spaced at a predetermined distance and, on the other hand, a total useful length capable of being reduced; the lookout further having a platform borne at the upper end of the ladder and provided with means for bracing against the substantially cylindrical and vertical support.

Hence the invention relates to a lookout capable of being transported in a compact form. The mentioned substantially cylindrical and vertical support may, for instance, be a tree or a post. The mentioned platform may be disposed at a predetermined angle to the ladder.

The term platform is understood to mean an element which, on the one hand, is contained within a flattened, substantially right-angled parallelepiped casing volume and, on the other hand, has two opposite main faces, a so-called lower face intended to be oriented toward the ground and a so-called upper face having a surface area at least large enough to hold a person, either standing or seated.

When the lookout is rested against a substantially cylindrical and vertical support, the platform extends in a substantially horizontal plane, and a person may climb the ladder, make the lookout integral with the support, e.g., by means of a strap, and take up a position on the platform.

2. Description of the Related Art

The prior art includes numerous lookouts distinguished essentially by the structural nature of the ladder used, which may be sliding-type double ladder as in U.S. Pat. No. 5,566,780; a dismountable ladder having uprights made up of telescoped sections as in U.S. Pat. No. 5,368,127; a dismountable ladder having uprights made up of superimposed hinged sections as in U.S. Pat. No. 4,742,888; or a dismountable ladder having uprights made up of sections which, having a particular cross-section, may be either telescoped or assembled compactly as in German Disclosed Application (Offenlegungsschrift) No. 41 09 166.

Although they can indeed be carried by a person when they have been disassembled, these known devices are relatively bulky, and it is hard for anyone to carry them on foot, even for short distances.

BRIEF DESCRIPTION OF THE DRAWINGS

It is an object of this invention to provide an improved lookout which is truly portable in a compact form and which can easily be carried by a person for long distances, especially over rough terrain, through underbrush, or the like.

A further object of the invention is to provide a lookout having a useful height, i.e., the height to which the platform can be moved, which is adjustable.

Still another object of the invention is to provide a lookout which can be quickly assembled and disassembled without the use of tools.

To this end, in the lookout according to the present invention, of the type initially mentioned, the improvement comprises forming each upright of the ladder intended to be associated with the platform of telescopic elements, each of which is of a length substantially equal to the distance separating two rungs.

Other objects and advantages of the invention will become apparent from the following detailed description of preferred embodiments thereof, taken in conjunction with the accompanying drawings, in which:

SUMMARY OF THE INVENTION

Figure 7:
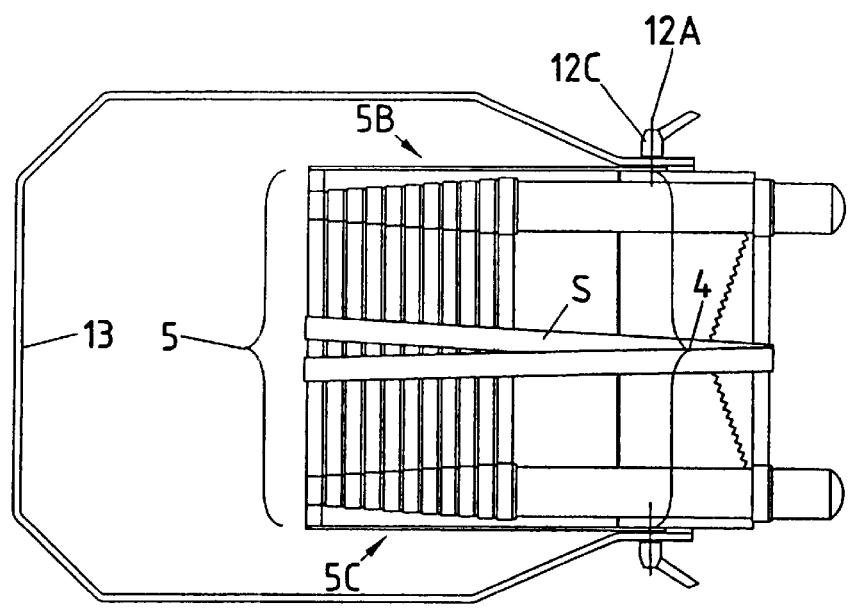
Figure 8:
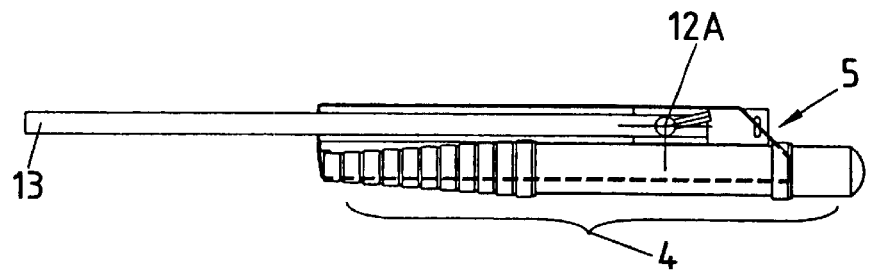
Figure 9:
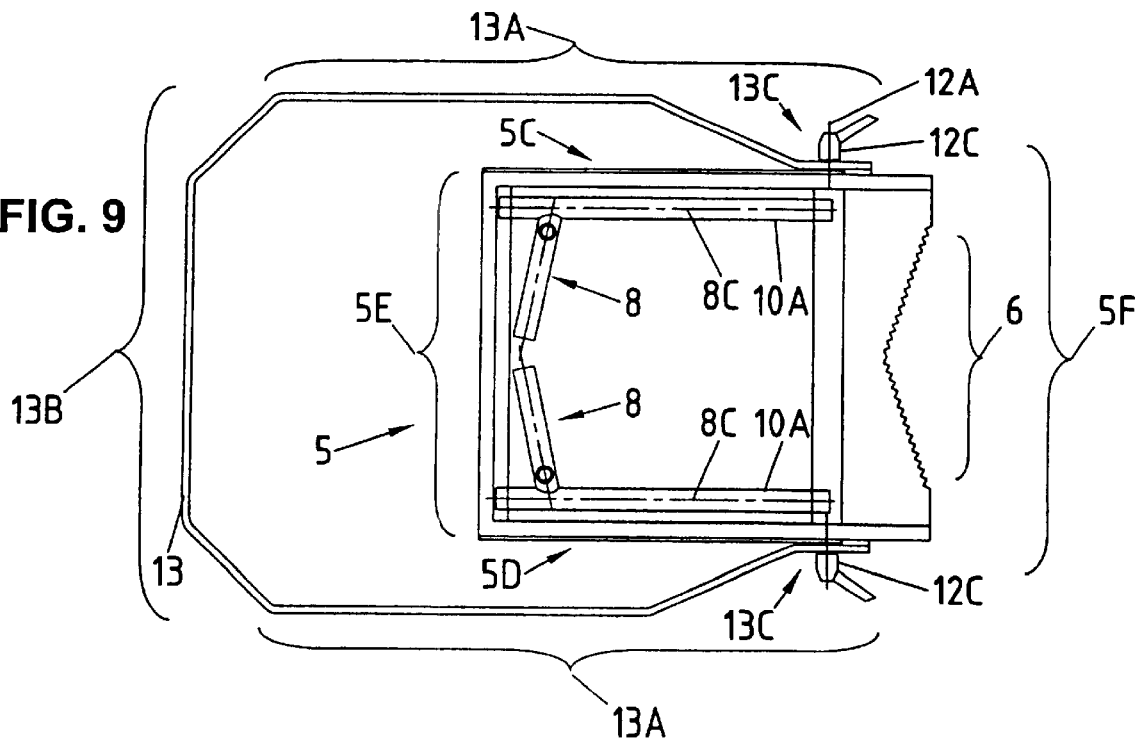
Figure 10:
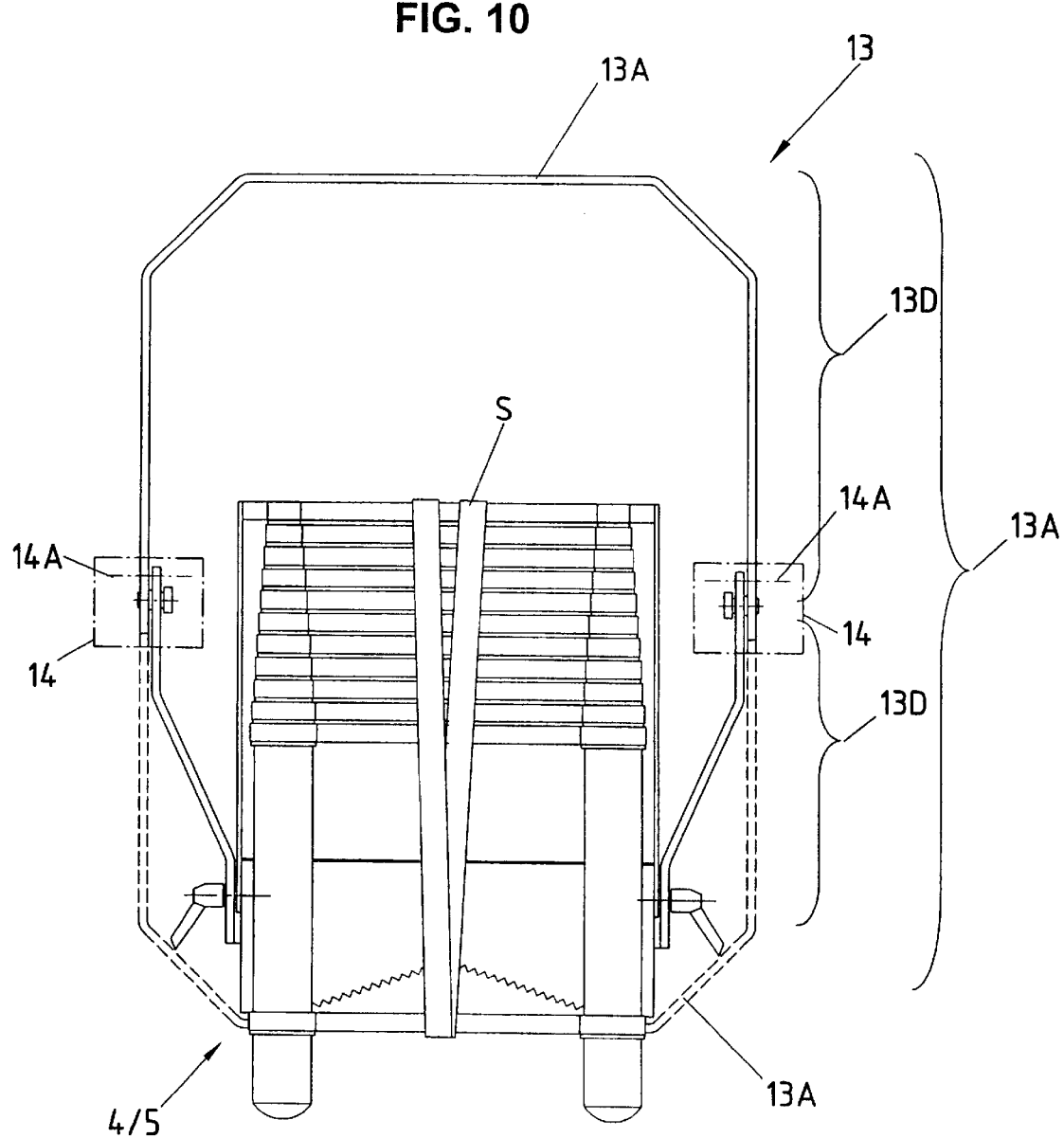
Figure 11:
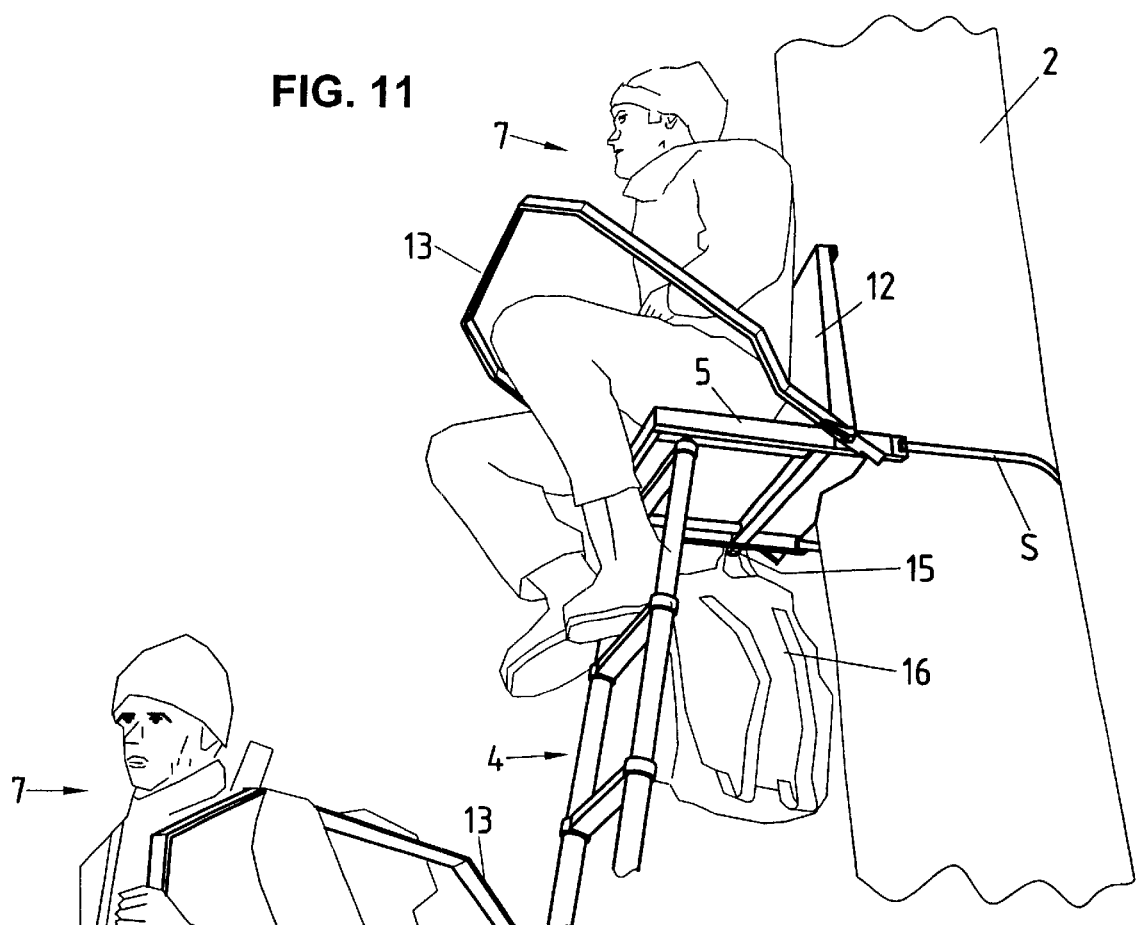
Figure 12:
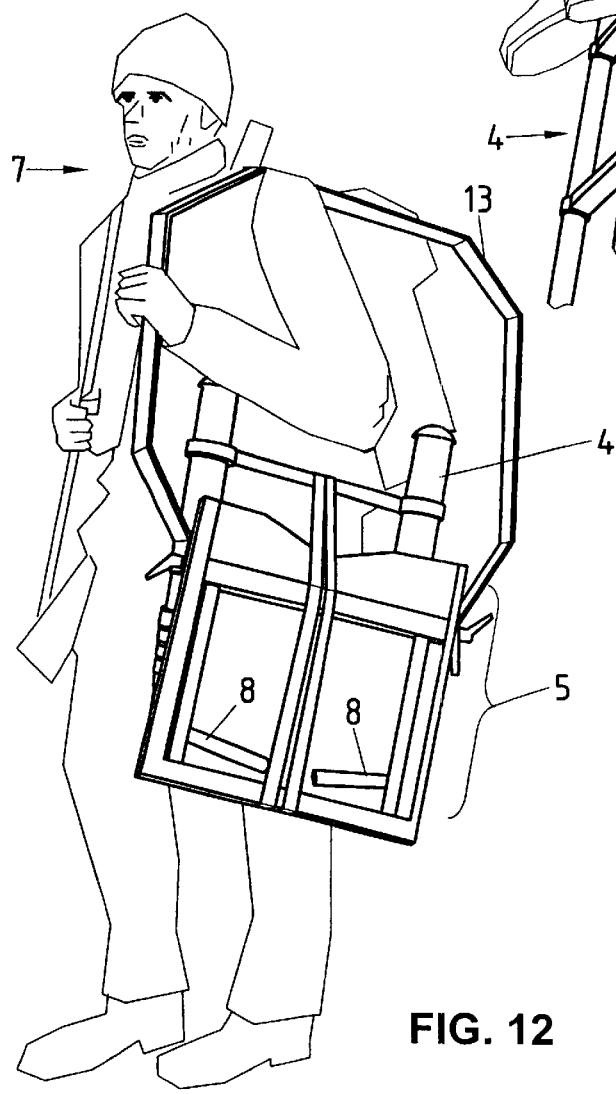

FIG. 1 is a profile view of a lookout according to the present invention in use;

FIG. 2 is a partial perspective view of the upper part of the inventive lookout in two parts while being assembled;

FIG. 3 is a partial perspective view of the upper part of the inventive lookout after assembly;

FIG. 4A is an elevation of the inventive lookout while being assembled;

FIG. 4B is a detail from FIG. 4A;

FIG. 5 is a top plan view of the platform shown in FIG. 4;

FIG. 6 is a front elevation of the inventive lookout shown in FIG. 4;

FIGS. 7–9 are front, side, and rear elevations, respectively, of a lookout according to the invention when disassembled and folded up to be carried by a person;

FIG. 10 is a front elevation of a lookout according to the invention, disassembled and folded up, in a modified embodiment;

FIG. 11 is a partial perspective view of the upper part of the inventive lookout when in use; and FIG. 12 is a perspective view of a lookout according to the invention, disassembled and folded up, being carried by a person.

FIGS. 1 and 11 of the drawings show a lookout 1 designed to be rested against a substantially cylindrical and vertical support 2, such as a tree or a post extending above the ground 3.

DETAILED DESCRIPTION OF THE PREFERRED EMBODIMENTS

Lookout 1 essentially comprises a ladder 4 and a platform 5 which, moved to the top 4A of ladder 4, forms a predetermined angle A with ladder 4 and is provided with means 6 for bracing against support 2.

Bracing means 6 preferably comprises a concave surface borne by a rigid part. For example, the concave surface is formed by a side face of a rigid flat part which, cut in a V shape, preferably includes indentations (FIGS. 7 and 10). The purpose of these indentations is to limit the risk of untimely slipping of means 6 against vertical support 2, such as a tree.

For safety's sake, platform 5, through its bracing means 6, is firmly held against support 2 by means of an attachment S, such as a strap which is anchored to platform 5 on either side of bracing means 6 and disposed in such a way as to embrace support 2. The strap is preferably anchored in oblong slots made in platform 5 on either side of bracing means 6.

As mentioned earlier, the term platform 5 is understood to mean an element 5 which is contained within a flattened, substantially right-angled parallelepiped casing volume and, on the other hand, has two opposite main faces, a so-called lower face 5A intended to be oriented toward the ground 3 and a so-called upper face 5B having a surface area at least large enough to hold a person 7, either standing or seated.

As is apparent from the drawings, ladder 4 comprises at least one upright 41 provided with a plurality of rungs 42 spaced at a predetermined distance P, and the total useful length of ladder 4 is capable of being reduced.

Each upright 41 of ladder 4 intended to be associated with platform 5 is made up of telescopic elements 43, each of which is of a length substantially equal to the distance P separating two rungs 42.

Telescopic elements 43 are understood to mean especially, but not solely, a plurality of tubular elements 43 which, having decreasing cross-sections, are successively fitted into one another and can each be moved translatingly along the longitudinal axis of the assembly between two positions, a retracted position and an extended position.

Ladder 4 preferably comprises two telescopic uprights 41.

Telescopic elements 43 are of a type such that they are provided with immobilization means 44, i.e., with means 44 which allow each element 43 to be translatingly immobilized relative to another element into which it is fitted, whether in retracted or extended position, these means 44 being selectively actuatable so as to permit adjustment of the useful length of ladder 4 by distance P.

In a manner known per se, means 44, for immobilizing each telescopic element 43 translatingly relative to another element with which it co-operates, comprises a sliding bolt which, housed in a seat provided in a rung 42 associated with one of the two telescopic elements 43 in question, is movable between two locations, viz., an active location in which, co-operating with stops borne by elements 43, it immobilizes them in extended position, and an inactive location in which it allows elements 43 to slide from the extended position to the retracted position.

Means 44 for immobilizing each telescopic element 43 translatingly relative to another element with which it co-operates is not shown nor described in detail inasmuch as it does not form part of the invention. Hence the location of immobilization means 44 is simply symbolized by a rectangle in the drawings.

In one preferred embodiment, platform 5 is sufficiently large to constitute the seat of a chair for an adult person 7.

As shown in the drawings (FIGS. 2 and 4–6), the platform 5 and the top 4A of ladder 4 includes the complementary assembly elements 8, 9. In order to make up the complementary assembly elements 8, 9:

platform 5 is provided, at the level of its lower face 5A, with two elongated rigid parts 8, each of which is borne by a means 10 for guidance between two positions, viz., a so-called retracted position, in which each rigid part extends substantially against the lower face 5A of platform 5, and a so-called extended position, in which they extend parallel to one another, defining a distance E1 between the telescopic elements in a plane P1 forming a predetermined angle A with a plane P2 medial to the casing volume defined between the two opposite lower and upper faces 5A, 5B of platform 5;

upper end 4A of the ladder 4 and the elongated rigid parts 8 borne by the platform 5 have complementary bearing surfaces that fit together so that the complementary assembly elements 8A, 8B, 9A, 9B, by cooperating, ensure the dismountable connection of platform 5 and the end 4A of the ladder 4. one of the bores 9A, and the other bearing surface 8B that provides a stop by resting against the end face 9B.

Plane P2 medial to the volume of platform 5 is understood to means a plane which extends midway between the two opposite lower and upper faces 5A, 5B of the casing volume of platform 5.

These technical characteristics make it possible to guarantee not only the compactness of the platform when it has to be transported, owing to the possibility of retracting rigid parts 8, but also great ease in mounting this unit since the assembly essentially consists in fitting parts into one another (FIGS. 2, 4A, 4B, 6).

In one preferred embodiment of the invention, upper part 4A of ladder 4 includes two bores 9A, each defined by a wall 9 which open into an end face 9B situated at the top of ladder 4 and extend along a distance E1, substantially parallel to the longitudinal direction of ladder 4; and platform 5 bears the elongated rigid parts 8 extending along a distance E1 substantially equal to the aforementioned distance E2 provided between the bores of the ladder 9A each including bearing surfaces 8A, 8B, with one bearing surface 8A that fits into one of the bores 9A, and the other bearing surface 8B that provides a stop by resting against the end face 9B.

The fact that the inventive lookout comprises only two parts 4, 5 to be assembled by fitting into one another makes it particularly easy to carry out assembly and disassembly. Thus, lookout 1 may easily be moved when the chosen site is not, or is no longer, suitable. Furthermore, it will be noted that the two-part structure 4, 5 makes it possible to use ladder 4 for preparing the site at which it is desired to install lookout 1, e.g., in order to cut a branch which is in the way.

Notably, complementary assembly elements 8, 9 of ladder 4 and platform 5 comprise a means 11 for locking in the assembled state. The assembly of ladder 4 and platform 5 may thereby be secured.

Locking means 11 preferably comprises at least:

a thread 11A tapped transversely in one of the rigid parts 8 at a predetermined distance from bearing surface 8B which limits the fitting together, a hole 11B drilled transversely in a wall 9 which defines bore 9A for receiving one of the rigid parts 8 so as to be able to coincide with thread 11A, at least one part 11C having, firstly, a body 11D intended to pass through wall 9 defining bore 9A to co-operate with thread 11A and prevent withdrawal of rigid part 8, and secondly, a manipulating head 11E which may, for example, be a button allowing manual manipulation, specifically between the thumb and index finger.

This locking device is extremely simple to operate.

Lookout 1 may thus be assembled and disassembled without the use of tools.

Means 10 for guiding each of the rigid parts 8 between their positions of is transport and of use is of a type such that it determines the oscillation of rigid part 8 about an axis 8C which, substantially parallel to plane P2, is secant to plane P1 in which rigid part 8 extends in use position.

These technical characteristics guarantee that a predetermined angle between median plane P2 of platform 5 and a plane P3 medial to ladder 4.

Plane P3 medial to ladder 4 is understood to mean a plane extending midway between two main faces of the casing volume of ladder 4.

The angle between plane P2 medial to platform 5 and plane P3 medial to ladder 4 is determined in such a way that, plane P2 being substantially horizontal, ladder 4 forms an angle with the ground 3 conforming to the safety recommendations. The user of lookout 1, who cannot modify the angle between plane P2 medial to platform 5 and plane P3 medial to ladder 4, is thereby led to dispose ladder 4 on the ground 3 in observing the safety recommendations relating to the angle of inclination of ladder 4, failing which use of platform 5 is, for one thing, particularly uncomfortable in cases of a non-recommended angle of inclination of ladder 4, and for another thing, totally impossible in the extreme cases of a prohibited angle of inclination.

In one embodiment, means for guiding 10 guides the rigid parts 8 between their transport and use positions. The guide means comprises a shaft 10A to which the rigid part 8 is attached on either side of the bearing surface 8A. The rigid part is rotatingly guided about its longitudinal axis 8C and prevented from rotating along axis 8C by retaining the bearing surfaces provided for that purpose, associated with platform 5.

For example, means 10 for guiding the shaft 10A bearing the rigid assembly parts 8 comprises the cylindrical bearing surfaces of revolution, co-operating with the complementary bearing surfaces provided at the ends of rigid assembly part 8, and opposite bearing surfaces co-operating with axis stops, likewise provided at the ends of rigid assembly part 8.

These technical characteristics guarantee that the assembly of platform 5 and ladder 4 is very sturdy inasmuch as rigid parts 8 borne by platform 5 each retract about an axis 8C secant to plane P1 in which ladder 4 must be situated after it has been assembled to platform 5 by means of complementary assembly elements 8, 9.

Advantageously, platform 5 forms the seat 5 of a chair which is bounded by the four borders 5C to 5F, comprising the two lateral borders 5C, 5D, the back border 5F provided with means 6 for bracing against a vertical support 2, and the front border 5E; the seat 5 further has a backrest 12 which can befolded down against the upper face 5B by swiveling about an axis 12A. The axis 12A is substantially parallel to the intersection of plane P2 and the plane in which backrest 12 meets the platform.

For hinging backrest 12 to platform 5:

platform 5 has, at the level of its two lateral borders 5C, 5D, bores aligned on the swiveling axis 12A on each side, backrest 12 bears two tongues 12B disposed on each side to extend substantially in the plane of one of the lateral borders 5C, 5D of platform 5 and each having a bore of revolution intended to be placed so as to coincide with the bore of the respesctive lateral border so that the respective lateral border and tongue bores are aligned along the swiveling axis 12A, the aligned bores of the lateral border and of the backrest are supported by a shaft having bearing surfaces for guiding the tongues of the backrest about the defined swiveling axis 12A. The bearing surfaces for immobilization rotatingly and translatingly in the bore in the platform, with at least one threaded free end, include a nut 12C for tightening tongue 12B against the border 5C, 5D to which it is adjacent, so as to allow backrest 12 to be immobilized either in the use position or transport positions.

Each nut 12C is preferably provided with a manipulating handle.

As may be seen in the drawings, platform 5 bears a safety rail 13 made up of a substantially U-shaped part 13 having two substantially parallel arms interconnected by a crosspiece 13B; the free ends 13C of parallel arms 13A are joined to two lateral borders 5C, 5D of platform 5 by a means ensuring a swiveling function about axis 12A at least substantially parallel to back border 5F of platform 5, and an immobilizing function in at least two positions, viz., a position in which safety rail 13 comprises plane P2, and a position in which safety rail 13 forms an angle of between 0 and 90 degrees with plane P2.

The swiveling means of the safety rail preferably includes bores at the free ends of respective parallel arms of the safety rail to hinge the safety rail to platform 5 about the swiveling axis 12A.

Parallel arms 13A of safety rail 13 are at least long enough so that in the position in which safety rail 13 comprises plane P2, a passage remains between crosspiece 13B and back border 5F of platform 5 which is at least sufficient for a person to pass his arm and shoulder through and thus hang platform 5 over his shoulder (FIG. 12).

In this way, after platform 5 and folded ladder 4 have first been rested against one another and then joined by an appropriate means, such as a strap, a person may easily carry the unit hung over one of his shoulders.

In one preferred embodiment (FIG. 10), each of the substantially parallel arms 13A of safety rail 13 is split into two half-arms 13D linked by swiveling means 14 that selectively performs swiveling and immobilizing functions The swiveling means 14 allows the half-arms to rotate along a so-called folding axis 14A approximately parallel to swiveling axis 12A and hinging the safety rail 13 to platform 5. The swiveling means also rotationally immobilizes the half-arms about axis 14A between two positions, i.e., one in which half-arms 13D extend in the continuation of one another and are locked in that position, and one in which half-arms 13D substantially extend against one another and are likewise locked in that position.

These technical characteristics allow the space taken up by safety rail 13 of platform 5 to be reduced even further.

Without excluding this possibility, the term "half-arms" does not necessarily mean that side arms 13A must each be divided into two parts of equal length. In one preferred embodiment, each of the side arms 13A is made up of two half-arms so that when the latter are disposed parallel to one another and along lateral borders 5C, 5D of platform 5, crosspiece 13B of safety rail 13 extends substantially against back border 5F of platform 5, thus making lookout 1 more compact when folded up.

Means 14 selectively performing swiveling and immobilizing functions preferably includes parts which can be manipulated manually.

Also preferably, platform 5 bears at least one side hook 15 disposed so that an object 16, such as a bag, may be hung from it (FIG. 11).

In one preferred embodiment, platform 5 comprises:

a substantially right-angle quadrilateral plate, one face of which defines upper face 5B of platform 5, and an opposite, so-called front face 5G is bounded by two portions 5C, 5D which, constituting the two opposite lateral borders of platform 5, are formed by folding the plate, each of the borders including a primary wing situated in a plane substantially perpendicular to front face 5G beyond which they extend, and a secondary wing oriented toward the opposite lateral border, two shafts 10A, each bearing one of the rigid parts 8 forming part of the complementary assembly elements 8, 9 and each extending substantially against front face 5G of the plate and parallel to one of the lateral borders 5C, 5D, two transverse, elongated parts 5H fixed to the plate that have a concave, U-shaped cross-section. Each plate extends with their concavity oriented toward the front face 5G of the plate between the two lateral borders 5C, 5D so as to be substantially squeezed between front face 5G of the plate and the secondary wing of each border 5C, 5D. One transverse elongated part 5H bounds the front border 5E of platform 5. The other transverse elongated part bounds the back border 5F of platform 5, facing the means 6 for bracing against a substantially cylindrical and vertical support. Each transverse elongated part includes two lateral perforations, into each of which, an end of one of the two guide shafts 10A is fitted until it butts against the face of the perforation.

The various components of platform 5 are preferably made of aluminum, and the components are preferably interconnected by means of rivets.

Observing these technical characteristics makes it possible to construct a sturdy, light platform economically.

In another preferred embodiment (FIGS. 4A-6), platform 5 comprises:

a structure made up of
  a U-shaped part,
    comprising two parallel arms, intended to form the lateral borders 5C, 5D of platform 5 and to serve as a tension support of a seat 17 of flexible material, and a crosspiece intended to constitute front border 5E,
    bearing a first transverse part joining the parallel arms, intended to constitute the back border 5F of platform 5 and to bear means 6 for bracing against a substantially cylindrical and vertical support 2,
    bearing a second transverse part likewise joining the parallel arms and extending approximately parallel to the crosspiece and midway between the crosspiece and the transverse part constituting back border 5F,
  two shafts 10A, each bearing one of the rigid parts 8 forming part of the complementary assembly elements 8, 9 and each extending parallel to one of the side arms of the U-shaped part,
  two groups of two opposite elements, the function of which is to make up the means for rotating guidance and translatory immobilization of support shafts 10A by co-operating with the ends of these shafts, two of these elements being borne by the crosspiece of the U-shaped part and the other two elements being borne by the second transverse part, the guide elements being disposed so as to ensure the guidance of support shafts 10A about axes 8C substantially parallel to the parallel arms of the U-shaped part.

The part making up the structure is preferably produced by bending a tubular element intended to constitute a tension support for a part made of flexible material forming the seat 17. In this embodiment, backrest 12 is preferably also produced by bending of a tubular element substantially into an inverted V-shape and by bracing the diverging arms by means of a strut, e.g., attached by welding. Viewed from the front, the backrest has substantially the shape of an A.

Although this is not shown in the drawings, the bent element in backrest 12 likewise constitutes a tension support of a part made of flexible material. In this embodiment, for hinging backrest 12 to platform 5:

platform 5 has at the level of its lateral borders 5C, 5D two tongues extending above its medial plane and having bores aligned on the same so-called swiveling axis 12A, substantially parallel to the intersection of medial plane P2 and a plane in which backrest 12 extends;

the free ends of the diverging arms of backrest 12 each include a bore of revolution intended to be placed so as to coincide with the bore included in a tongue borne by the platform;

the aligned bores of the tongues of the platform and the backrest are traversed by a shaft having a bearing surface for rotatingly guiding the tongue of the backrest about defined swiveling axis 12A, at least one bearing surface of immobilization rotatingly and translatingly in the bore of the platform, a threaded free end on which is fitted a nut for tightening the tongue against the border to which it is adjacent, so as to allow the backrest to be immobilized either in use position or in transport position.

By designing a platform which, when folded up, is contained within a parallelepiped volume having sides measuring 0.6, 0.5, and 0.065 meters, and by using a ladder which, when folded up (FIGS. 7–9), is contained within a parallelepiped volume having sides measuring 0.73, 0.5, and 0.07 meters, a unit is obtained which can be packed without difficulty in the trunk of a car or inside the car, e.g., behind one of the seats.

In FIGS. 7–10 and 12, the ladder and the platform are shown held together by means of an attachment, such as a strap S. It is preferably the attachment means allowing the lookout to be fastened to vertical support 2 which is used to hold the ladder and the platform together in the aforesaid transport configuration.

A unit of such a volume may likewise be easily put away in a closet.

The ladder is preferably used at a height adjustable between about 0.7 and 3.5 meters. With such a ladder, the visual height is put at 4.5 meters.

By way of example, when the platform and the ladder are made essentially of aluminum in the dimensions indicated, the lookout made up has a mass of about 14 kg.

What is claimed is:

1. A lookout capable of being rested against a substantially cylindrical and vertical support extending above the ground, said lookout comprising a ladder having a total useful length capable of being reduced and including at least one upright provided with a plurality of rungs spaced at a predetermined distance, and a platform selectively connected to an upper end of said ladder and provided with means for bracing against said substantially cylindrical and vertical support, wherein the at least one upright of said ladder is made up of telescopic elements, each of said telescopic elements being of a length substantially equal to the distance separating two of said rungs, wherein:

said platform has a lower face intended to face the ground and an upper face opposite said lower face and at least large enough to hold a person;

said platform and the upper end of said ladder respectively include complementary assembly elements for selectively connecting said ladder to said platform;

said platform is provided, at the level of said lower face, with two elongated rigid parts, each borne by a guide means for guidance between a retracted position, in which each of said rigid parts extends substantially against said lower face, and an extended position, in which said rigid parts extend parallel to one another with a predetermined angle between a longitudinal direction of said ladder and a further plane medial to a casing volume defined between said lower and upper faces of said platform; and said upper end of said ladder and said elongated rigid parts borne by said platform have complementary fitting bearing surfaces intended to co-operate for ensuring the selective connection of said platform and said upper end of said ladder.

2. The lookout of claim 1, wherein said telescopic elements are provided with immobilizing means for allowing each of said telescopic elements to be immobilized relative to another of said telescopic elements into which it fits in both of the retracted and extended positions, said immobilizing means being selectively actuatable for adjusting the useful length of said ladder.

3. The lookout of claim 1, wherein the upper end of said ladder includes two bores which, each defined by a wall, open into an end face situated at the top of said ladder and extend along the predetermined distance between the rungs substantially parallel to the longitudinal direction of said ladder; and the elongated rigid parts extending from the platform along a distance substantially equal to the predetermined distance between the rungs and each including two bearing surfaces, one of which enables fitting into one of the bores and the other limits such fitting by resting against said end face.

4. The lookout of claim 1, further comprising locking means to lock the ladder and said platform to each other in an extended or retracted position.

5. The lookout of claim 1, wherein said guide means for guiding each of said rigid parts between the retracted and the extended positions determines the oscillation of said rigid part about an axis substantially parallel to said plane medial to said platform and secant to said plane in which said rigid part extends in the extended position.

6. The lookout of claim 5, wherein said guide means comprises a shaft to which said rigid part is fixed at one end, said shaft being rotatingly guided on either side of the zone of attachment of said rigid part about its longitudinal axis and prevented from rotating along said axis by guiding bearing surfaces associated with said platform.

7. The lookout of claim 1, wherein said platform includes a safety rail with a substantially U-shaped part having two substantially parallel arms interconnected by a crosspiece, free ends of said parallel arms being rotationally joined to two lateral borders of said platform for swiveling the safety rail about an axis at least substantially parallel to a back border of said platform and having an immobilizing means for maintaining the safety rail in at least two positions, including a position in which said safety rail is in said plane medial to said platform and a position in which said safety rail forms an angle of between 0 and 90 degrees with the plane medial to the platform.

8. The lookout of claim 7, wherein said platform comprises a substantially right angle quadrilateral plate, one face of which defines said upper face of said platform, an opposite front face opposite to the upper face being bounded by two portions constituting the two opposite lateral borders of said platform, the borders being formed by folding said plate, each of said borders including a primary wing situated in a plane substantially perpendicular to said front face beyond which they extend, and a secondary wing oriented toward the opposite lateral border, two guide shafts, each bearing one of said rigid parts forming part of said complementary assembly elements and each extending substantially against said front face of said plate and parallel to one of said lateral borders, and two transverse elongated parts fixed to said plate, having a concave, U-shaped cross-section, each extending with their concavity oriented toward said front face of said plate between said two lateral borders between said front face of said plate and said secondary wing of each said border, one of said transverse elongated parts bounding a front border of said platform and the other extending to a back border of said platform, facing said means for bracing against a substantially cylindrical and vertical support, and each including two lateral perforations, into each of which one of the end of said guide shafts is fitted until it butts against a face of said concave elongated transverse part.

9. A lookout capable of being rested against a substantially cylindrical and vertical support extending above the ground, said lookout comprising a ladder having a total useful length capable of being reduced and including at least one upright provided with a plurality of rungs spaced at a predetermined distance, and a platform selectively connected to an upper end of said ladder and provided with means for bracing against said substantially cylindrical and vertical support, wherein the at least one upright of said ladder is made up of telescopic elements, each of said telescopic elements being of a length substantially equal to the distance separating two of said rungs, wherein the platform comprises a U-shaped part, the U-shaped part having:

two parallel arms that form lateral borders of the platform and serve as a tension support for a seat of flexible material;

a first transverse part joining the two parallel arms, forming a back border of the platform and supporting the bracing means;

a cross piece that forms a front border of the platform;

a second transverse part approximately parallel to the first transverse part and joining the two parallel arms at an appropriate midpoint between the crosspiece and the first transverse part;

a complementary assembly for attaching the platform to the ladder including two support shafts, each bearing one of two rigid parts, the rigid parts being part of the complementary assembly;

two groups of two opposite guide elements that allow for rotational guidance and immobilization of the support shafts, borne by the crosspiece and the second transverse part;

the guide elements being disposed to ensure the guidance of the support shafts about the axis substantially parallel to the two parallel arms.

10. The lookout of claim 9, wherein said telescopic elements are provided with immobilizing means for allowing each of said telescopic elements to be immobilized relative to another of said telescopic elements into which it fits in both of the retracted and extended positions, said immobilizing means being selectively actuatable for adjusting the useful length of said ladder.

11. The lookout of claim 9, wherein the upper end of said ladder includes two bores which, each defined by a wall, open into an end face situated at the top of said ladder and extend along the predetermined distance between the rungs substantially parallel to the longitudinal direction of said ladder; and the elongated rigid parts extending from the platform along a distance substantially equal to the predetermined distance between the rungs and each including two bearing surfaces, one of which enables fitting into one of the bores and the other limits such fitting by resting against said end face.

12. The lookout of claim 9, further comprising locking means to lock the ladder and said platform to each other in an extended or retracted position.

13. The lookout of claim 9, wherein said guide means for guiding each of said rigid parts between the retracted and the extended positions determines the oscillation of said rigid part about an axis substantially parallel to said plane medial to said platform and secant to said plane in which said rigid part extends in the extended position.

14. The lookout of claim 9, wherein said platform includes a safety rail with a substantially U-shaped part having two substantially parallel arms interconnected by a crosspiece, free ends of said parallel arms being rotationally joined to two lateral borders of said platform for swiveling the safety rail about an axis at least substantially parallel to a back border of said platform and having an immobilizing means for maintaining the safety rail in at least two positions, including a position in which said safety rail is in said plane medial to said platform and a position in which said safety rail forms an angle of between 0 and 90 degrees with the plane medial to the platform.

15. The lookout of claim 13, wherein said guide means comprises a shaft to which said rigid part is fixed at one end, said shat being rotatably guided on either side of the zone of attachment of said rigid part about its longitudinal axis and prevented from rotating along said axis by guiding bearing surfaces associated with said platform.

16. The lookout of claim 14, wherein said platform includes a safety rail with a substantially U-shaped part having two substantially parallel arms interconnected by a crosspiece, free ends of said parallel arms being rotationally joined to two lateral borders of said platform for swiveling the safety rail about an axis at least substantially parallel to a back border of said platform and having an immobilizing means for maintaining the safety rail in at least two positions, including a position in which said safety rail is in said plane medial to said platform and a position in which said safety rail forms an angle of between 0 and 90 degrees with the plane medial to the platform.

* * * * *